T. I. PHELPS.
PEANUT PICKING MACHINE.
APPLICATION FILED AUG. 4, 1913. RENEWED NOV. 29, 1919.
1,328,295.
Patented Jan. 20, 1920.
3 SHEETS—SHEET 1.
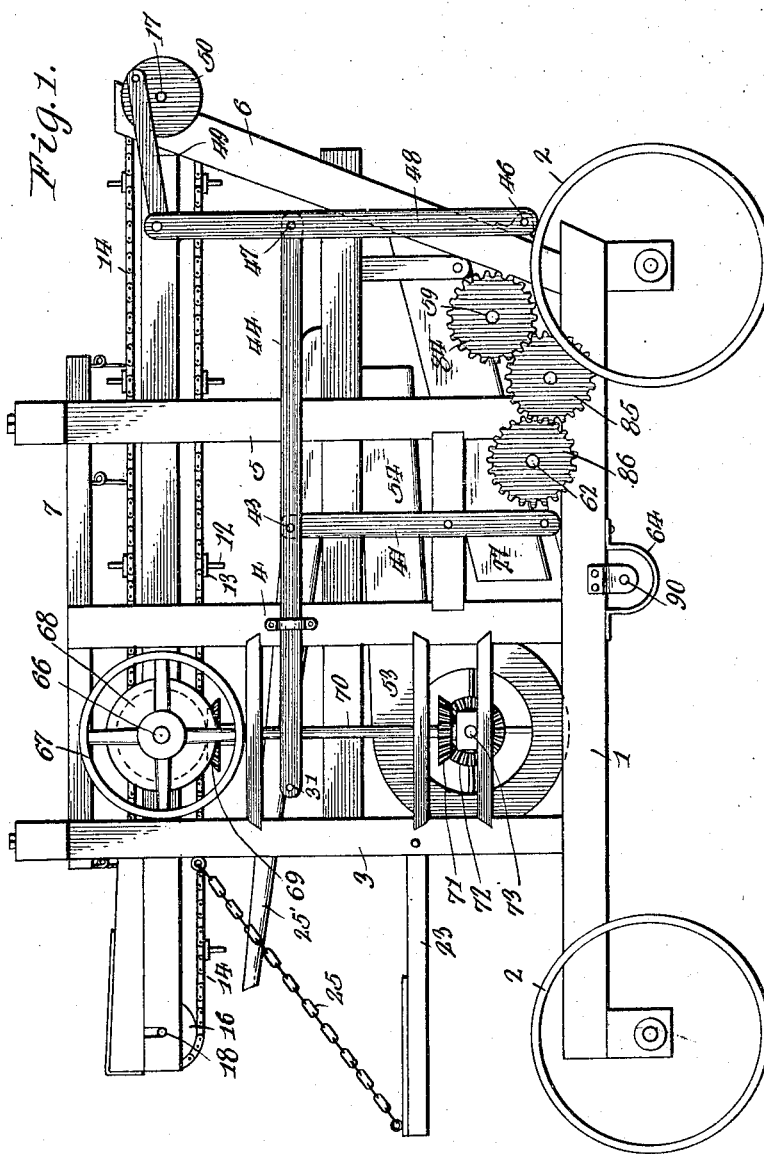

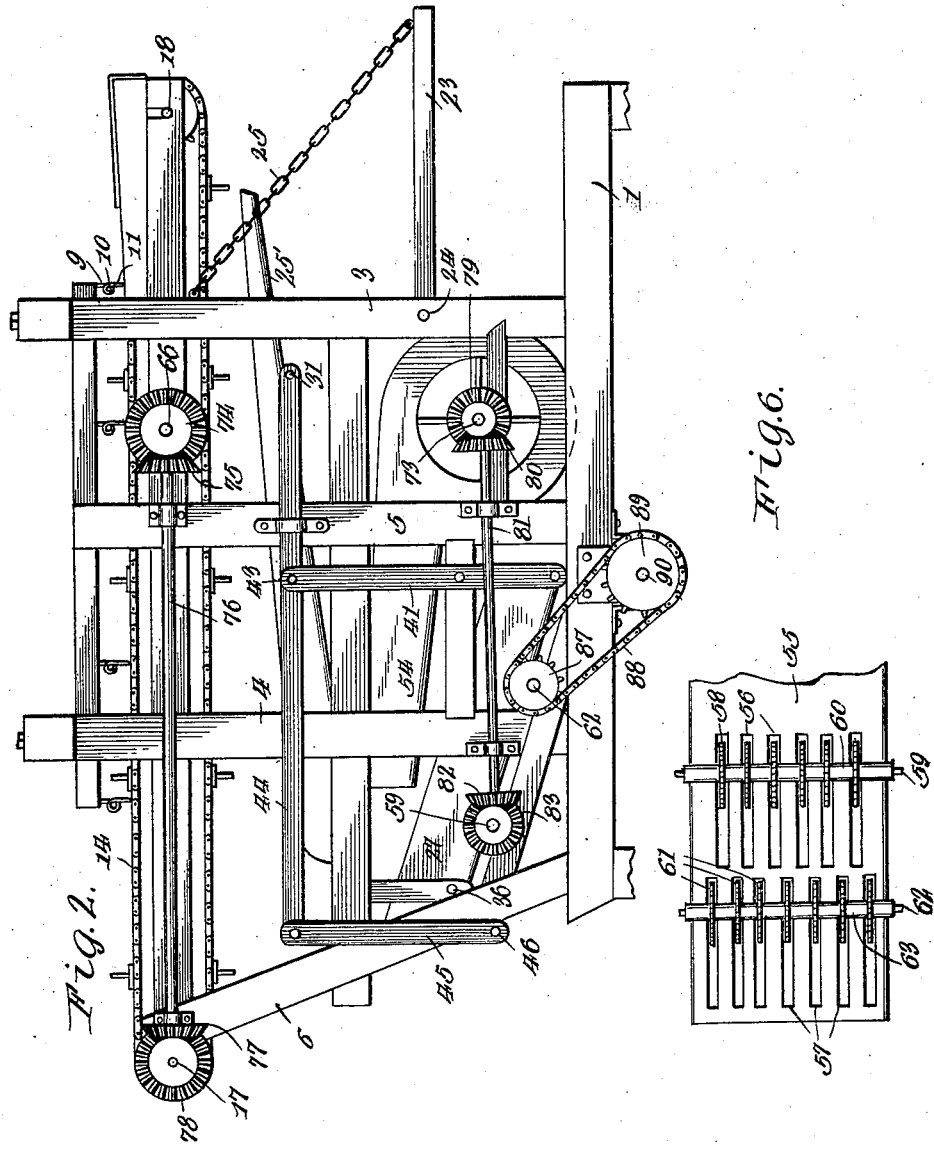

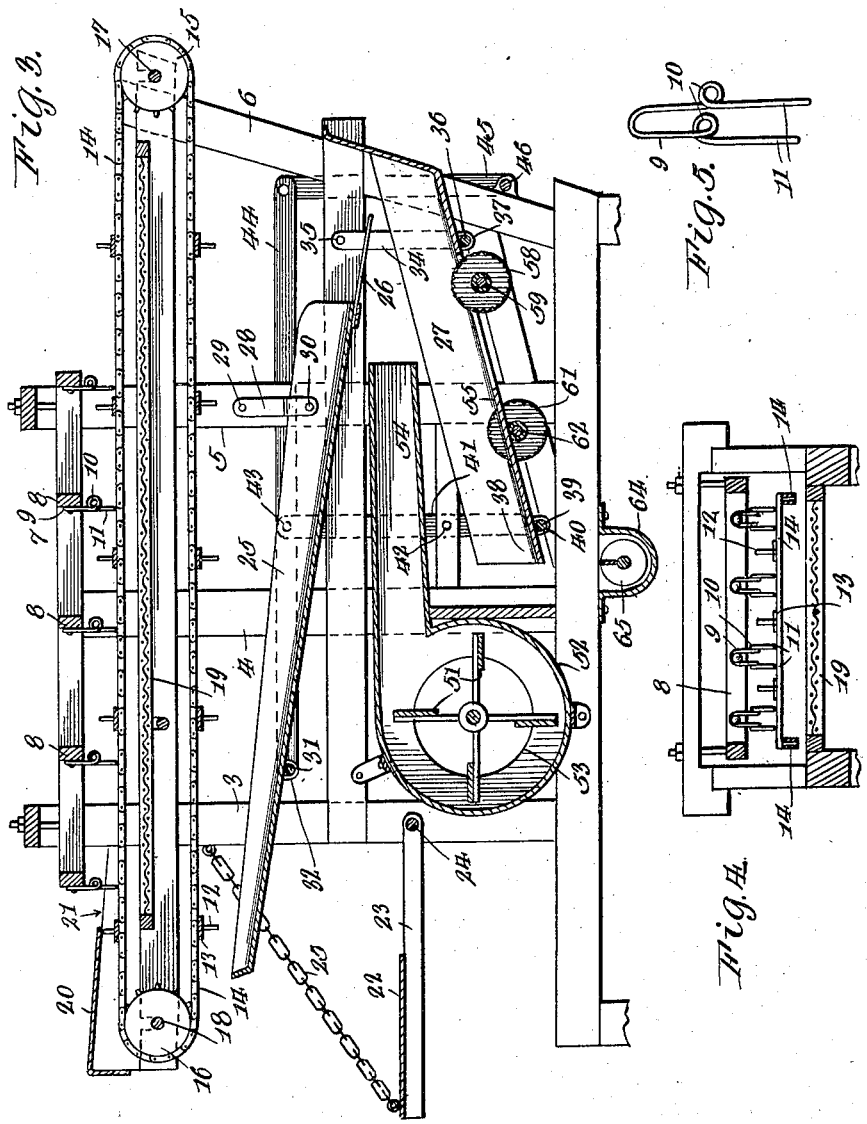

UNITED STATES PATENT OFFICE.

THEOPHILUS I. PHELPS, OF LEWISTON, NORTH CAROLINA.

PEANUT-PICKING MACHINE.

1,328,295.  Specification of Letters Patent.  Patented Jan. 20, 1920.

Application filed August 4, 1913, Serial No. 782,908. Renewed November 29, 1919. Serial No. 341,468.

*To all whom it may concern:*

Be it known that I, THEOPHILUS I. PHELPS, a citizen of the United States, residing at Lewiston, in the county of Bertie and State of North Carolina, have invented certain new and useful Improvements in Peanut-Picking Machines, of which the following is a specification.

This invention relates to improvements in peanut picking machines for separating the peanuts from the vines and roots and from the stems and also other foreign matter, and the invention consists in the combination and arrangement of parts, hereinafter described, in connection with the accompanying drawings and pointed out in the appended claim.

In the drawings:

Figure 1, is a view in side elevation embodying one form of my invention.

Fig. 2, is a view of the opposite side from the side shown in Fig. 1.

Fig. 3, is a longitudinal, sectional view of the machine.

Fig. 4, is a transverse sectional view taken through the picker mechanism.

Fig. 5, is a perspective detail view of one of the pickers detached from the machine.

Fig. 6, is a bottom plan view of a stemming device.

Like characters of reference designate similar parts throughout the different figures of the drawings.

As shown, the machine of my invention is mounted upon a frame structure 1, which may be supported upon bearing wheels 2, frame uprights 3, 4, and 5, being provided to support the various mechanisms and devices comprising the machine, and an inclined upright 6, is also provided at one end of the frame 1. At the top of the machine, a picker frame, designated as a whole at 7, is rigidly mounted and is provided with a plurality of transversely disposed bar supports 8, on each of which a plurality of the pickers is mounted. As shown more clearly in Figs. 4 and 5, the pickers consist of a length of U-shaped spring wire 9, bent to U-shape form with the legs thereof coiled at 10, to increase resiliency. The free ends 11, of the legs project downwardly intermediate picking pins 12. The picking pins 12, are disposed upon transverse bars 13, carried by an endless belt or chain 14, in such a manner as to permit of co-action between the pickers 9, and the pins 12, for the purpose of separating the peanuts from the vines and roots during the passage of the material under the pickers 9, in the direction of the arrow shown in Fig. 3. In the form shown, two endless chains 14, are provided and the same are trained about the sprocket wheels 15 and 16. The sprocket wheels 15, are mounted upon a shaft 17, and sprocket wheels 16, are mounted upon a shaft 18, both of which shafts are suitably journaled in the frame of the machine. A screen 19, is disposed below the upper bights of the endless chain 14, which is of open mesh to receive the peanuts as they are separated from the vines by the picker mechanisms and permit descent downwardly therefrom onto trough 25. Said screen 19, is of sufficient length to extend practically the entire length of the upper bight of the chains 14, and is rigidly mounted to the frame in any convenient manner, as shown in Fig. 4.

A delivery board or table 20, overhangs one end of the picker mechanism and permits of a hand distributed feed of the vines to the picker at the point indicated by the arrow 21. A support 22, for the operator may be in the form of a platform mounted upon arms 23, pivoted to the frame at 24, and supported by the chains 25.

The peanuts dropping through the screen 19, will descend into the trough 25, which is inclined downwardly and is provided with wire extensions 26, at its delivery end. The trough 25, delivers to the stemming trough 27, which latter is inclined downwardly and disposed in a direction reverse to the inclination of the trough 25. Trough 25, is pivotally supported by arms 28, which are pivoted to the frame at 29 and to the trough at 30. These arms support the trough 25, at one end. At the other end of the trough 25 a bar or rod extends transversely thereunder and may be embraced by the U-shaped attaching means 32. The stemming trough 27, is supported at one end by arms 34, which are pivotally mounted at 35, to the frame and which are connected with a rod 36, extending beneath and loosely secured to said stemming trough as indicated at 37. The delivery end 38, of the stemming trough 27, is supported by bar or rod 39, loosely connected with the trough at 40, and carried by trough vibrating arms 41. The arms 41, are pivoted intermediate of their ends at 42, to the frame, and the upper ends of the arms 41, are connected at 43 to links 44. The forward ends of the links 44, are connected to the rod 31, supporting one end of the trough 25, and the other ends of the links 44, that is of one link, is connected to an arm 45, pivoted on a shaft 46. The corresponding end of the other link 44, is connected at 47, with an arm 48, which latter is also mounted to the shaft 46. The arm 48, is connected by a pitman 49, with a crank or disk 50, mounted on shaft 17.

It will be readily understood from the foregoing that as the disk 50 revolves, the connections just described will impart longitudinally vibratory motion, in opposite directions, to the receiving trough 25 and the stemming trough 27, which longitudinal vibration together with the inclination of the troughs, will serve effectively to advance the contents thereof in a manner which will now be obvious.

In order to withdraw small particles of foreign matter which may accompany the peanuts when discharged into the trough 27, I provide means which may be in the form of a blower fan 51, provided with a fan casing 52, having an axial inlet 53. The casing 52, is provided with a tubular intake portion 54, which extends toward and into suction range of the path of the discharge of the peanuts from trough 25 to trough 27. It will be understood that while the roots and vines will be separated from the peanuts during the passage through the picker mechanism, the stems will to a greater or less extent, not be separated from the peanuts and therefore I provide a stemming device which is in the form of a stemming trough 27.

As will be seen more clearly by reference to Fig. 6, the bottom wall 55, of the stemming trough 27, is provided with a plurality of sets of slots 56 and 57, one set being disposed in advance of the other, and the slots of one set being preferably arranged in staggered relation in respect to the slots in the other set so as to effectively operate throughout the transverse area of the trough and to act upon all material passing therethrough.

Saws or like peripherally serrated elements 58, are mounted upon a shaft 59, and are suitably spaced apart from each other by sleeves 60. The shaft 59, is mounted below the trough 27 and in such a manner as to cause the saws to project upwardly through the slots 56, in order to detach the stems from the peanuts. It will be noted that the saws are advantageously placed at those ends of the slots nearest the incoming material so as to provide open slotted areas of considerable length rearwardly of the saws in the path of the travel of the peanuts.

Similar saws 61, are mounted upon a shaft 62, and are spaced in suitable relation by the sleeves 63. The saws 61, operate in a manner similar to the saws 58, and it will thus be seen that I provide a plurality of stemming devices for successively operating upon the peanuts during their passage through the trough. It will also be noted that the longitudinally vibrating motion imparted to the trough 27, will greatly enhance the effectiveness of said stemming devices by insuring the engagement of the peanuts therewith.

The trough 27, discharges into a conveyer trough 64, which may be provided with a screw or suitable form of conveyer 65, to advance the peanuts to a suitable point of receipt.

Finally, referring to the manner in which power is transmitted to the several devices, 66, designates a main drive shaft which may be provided with a pulley 67. Power is transmitted through shaft 66 by the bevel gears 68 and 69, to the vertically disposed shaft 70, and therefrom by bevel gears 71 and 72, to the shaft 73, on which the fan 51, is mounted.

As will be seen by reference to Fig. 2, a bevel gear 74, is mounted on the main drive shaft 66, and meshes with a bevel gear 75, mounted on shaft 76. The shaft 76, carries a bevel gear 77, which meshes with a bevel gear 78 on shaft 17, thereby transmitting power to the chains 14. Power is transmitted from the fan shaft 73, by gears 79 and 80 to shaft 81. The shaft 81, is provided with a bevel gear 82, meshing with the bevel gear 83 on shaft 59, which is one of the saw shafts.

The teeth of the bevel gears 82 and 83, may engage with sufficient play to accommodate the vibration of the trough 27. On the shaft 59, is mounted a gear 84, which meshes with an idler gear 85, and the latter meshes with a gear 86, on saw shaft 62, whereby power is transmitted from shaft 59 to shaft 62.

On the opposite side of the machine from that shown in Fig. 1, shaft 62, carries a sprocket 87, on which a chain 88, is trained, and said chain is also trained about a sprocket 89, mounted on shaft 90, of the conveyer 65.

It is believed that the operation of the machine will be fully understood from the foregoing description and that its advantages in the operation and structure will be apparent.

While I have herein shown and described a specific form of my invention I do not wish to be limited thereto except for such limitations as the claim may import.

I claim:—

In a peanut picking machine comprising a frame, a stemming trough, vertical vibrating arms pivoted intermediate their ends upon said frame, a bar passing under said stemming trough and connected to the lower ends of said vibrating arms, a second set of arms supporting the outer end of said stemming trough, horizontally extending links slidably mounted upon said frame and connected intermediate their ends to said vibrating links, operating arms pivotally mounted upon said frame and engaging the rear ends of said horizontally extending links, a receiving trough, links supporting the rear end of said receiving trough, a rod extending across and under the bottom of said receiving trough near the outer end thereof and connected to the outer ends of said horizontal links for connecting said links to said receiving trough and bracing said receiving trough, and crank means connected with one of said operating arms for swinging said operating arms.

In testimony whereof I affix my signature in presence of two witnesses.

THEOPHILUS I. PHELPS.

Witnesses:
L. W. THOMPSON,
W. H. SPINY.